United States Patent
Wong

(10) Patent No.: US 7,177,609 B1
(45) Date of Patent: Feb. 13, 2007

(54) CHOPPER-DIRECT-CONVERSION (CDC) RADIO ARCHITECTURE

(75) Inventor: Hee Wong, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 383 days.

(21) Appl. No.: 10/440,026

(22) Filed: May 16, 2003

(51) Int. Cl.
*H04B 1/16* (2006.01)

(52) U.S. Cl. .................. 455/216; 455/205; 455/204; 455/203; 455/47; 455/104; 455/109; 455/48; 375/321; 375/270; 375/277

(58) Field of Classification Search ............... 455/334, 455/205, 208, 209, 216, 47, 104, 204; 375/321, 375/270
See application file for complete search history.

(56) References Cited

U.S. PATENT DOCUMENTS

| | | | |
|---|---|---|---|
| 4,628,518 A * | 12/1986 | Chadwick et al. .......... 375/334 |
| 5,584,066 A * | 12/1996 | Okanobu .................... 455/302 |
| 6,714,604 B1 * | 3/2004 | Tsurumi et al. ............. 375/329 |
| 6,731,917 B1 * | 5/2004 | Krishna ...................... 455/205 |
| 6,842,077 B2 * | 1/2005 | Oga ............................. 331/46 |
| 6,952,570 B2 * | 10/2005 | Nagayasu ................... 455/208 |
| 6,961,546 B1 * | 11/2005 | Rofougaran et al. ........ 455/118 |
| 2003/0125005 A1 * | 7/2003 | Lee ............................. 455/302 |

* cited by examiner

*Primary Examiner*—Edan Orgad
*Assistant Examiner*—Richard Chan

(57) ABSTRACT

A chopper-direct-conversion (CDC) radio receiver includes a phase-alternating mixer receiving an antenna input signal and at least one local oscillator signal and generating a double sideband signal in a single mixing step. The phase-alternating mixer may be implemented by two parallel mixers each mixing the input signal with one of two local oscillator signals and an adder receiving and summing outputs from the two parallel mixers, by a track-and-hold circuit sampling the input signal based upon the local oscillator signal, or by a window averaging circuit averaging the input signal across a period of the local oscillator signal. The CDC architecture is suitable for fabrication on a single chip and offers solutions to virtually all problems found in conventional direct-conversion receivers.

20 Claims, 7 Drawing Sheets

CHOPPER-DIRECT-CONVERSION (CDC) RADIO ARCHITECTURE

TECHNICAL FIELD OF THE INVENTION

The present invention is directed, in general, to radio receiver architectures and, more specifically, to a phase-alternating mixer producing a double-sideband signal and suitable for implementation on a single chip.

BACKGROUND OF THE INVENTION

Building single chip radio receivers with no off-chip channel filters has recently become popular, probably due to the explosive demand for miniaturized cellular telephone and other wireless network products. Most receivers of this type are designed with either zero intermediate frequency (Zero-IF) or Low-IF architectures, using direct-conversion or near direct-conversion schemes to allow for a low operating frequency with on-chip filters and signal processing circuits.

High integration with more on-chip circuits becomes possible in such architectures, but stringent circuit requirements must be imposed on direct current (DC) offsets, low frequency (1/f) noise, and local oscillator leakages. Some of these requirements are extremely difficult to achieve, with the apparent result that receivers designed around such architectures tend to inferior performance with respect to conventional surface acoustic wave (SAW) based superheterodyne architectures.

Because of the above-described shortcomings, realizing high performance single chip radio receivers is still an extremely difficult task. There is, therefore, a need in the art for a new radio receiver architecture, which should possess all advantages of the existing architectures without the disadvantages. In addition to a goal of high integration, comparable performance and ease of manufacturing should be factors taken into consideration.

SUMMARY OF THE INVENTION

To address the above-discussed deficiencies of the prior art, it is a primary object of the present invention to provide, for use in a radio receiver, a chopper-direct-conversion (CDC) radio receiver that includes a phase-alternating mixer receiving an antenna input signal and at least one local oscillator signal and generating a double sideband signal in a single mixing step. The phase-alternating mixer may be implemented by two parallel mixers each mixing the input signal with one of two local oscillator signals and an adder receiving and summing outputs from the two parallel mixers, by a track-and-hold circuit sampling the input signal based upon the local oscillator signal, or by a window averaging circuit averaging the input signal across a period of the local oscillator signal. The CDC architecture is suitable for fabrication on a single chip and offers solutions to virtually all problems found in conventional direct-conversion receivers.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 2 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1A:
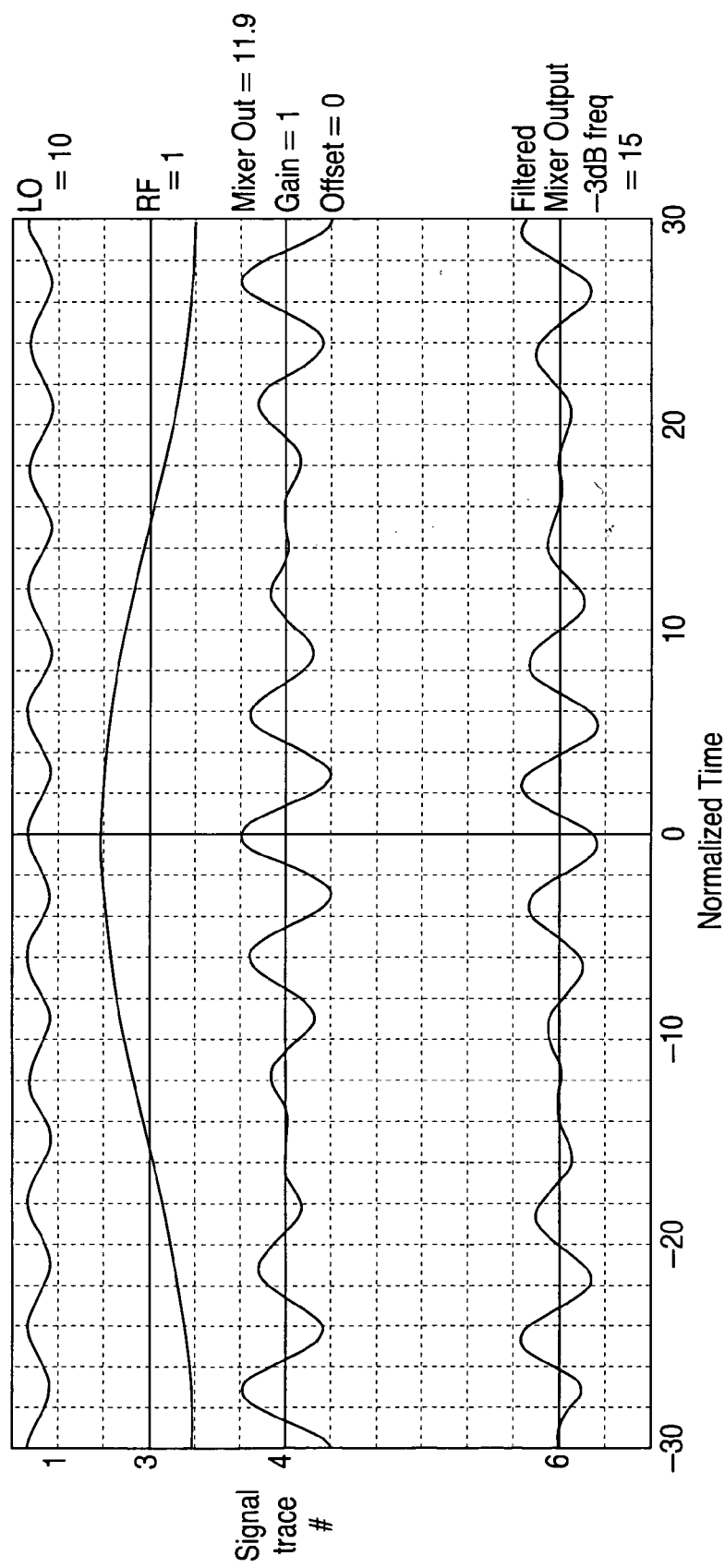
FIGS. 1A–1B are plots illustrating generation of double-sideband signals.
Figure 1B:
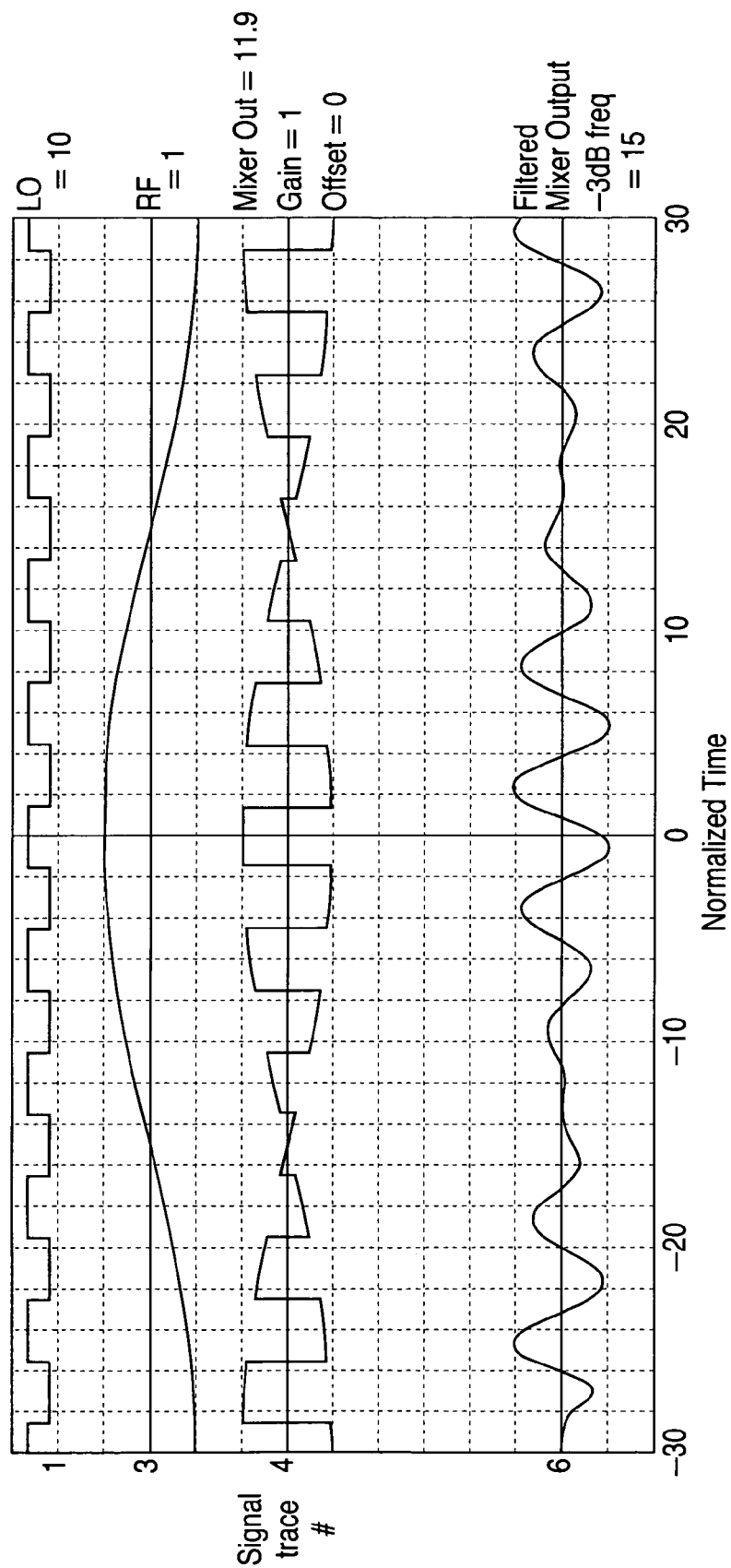

FIGS. 1A and 1B are plots illustrating generation of double-sideband signals. A double-sideband (DSB) signal can be obtained by multiplying two sinusoidal signals RF ("radio frequency") and LO ("local oscillator") together. The product of signals RF and LO is a DSB signal containing two sideband components:

$$\cos(LO)*\cos(RF)=0.5[\cos(LO-RF)+\cos(LO+RF)] \qquad (1)$$

where cos(LO−RF) is the lower sideband and cos(LO+RF) is the upper sideband.

FIG. 1A illustrates multiplying sinusoidal waveforms LO (trace 1) having a frequency of 10 cycles per unit time and RF (trace 3) having a frequency of one cycle per unit time to produce an unfiltered mixer output (trace 4). After low-pass filtering to remove high frequency harmonics, a filtered mixer output (trace 6) constituting a filtered DSB signal is produced. All parameter values (e.g., frequency, amplitude) for the examples of FIGS. 1A and 1B, as well as other examples herein, are arbitrary and normalized, selected solely for the purpose of illustrating the invention.

FIG. 1B illustrates mixing a square wave signal LO (trace 1) with a sinusoidal signal RF (trace 3) to produce an unfiltered output (trace 4) and, after additional low-pass filtering to remove high frequency harmonics, a filtered DSB output signal (trace 6) identical to that in FIG. 1A. The unfiltered mixer signal (trace 4) in FIG. 1B has a signal format comparable to the output of a conventional chopper amplifier, and thus shares benefits similar to the chopper.

In essence, the chopping frequency (LO=10 cycles/unit time) converts the sinusoidal signal (RF=1 cycle/unit time) into a DSB signal with a frequency of 11 and 9 cycles/unit time, respectively, for the upper and lower sidebands. Since the DSB signal operates at higher frequencies than the original signal (RF=1 cycle/unit time), the circuit can avoid operating near direct current frequency (0 cycles/unit time). After further signal filtering and processing in DSB format, the original signal RF can be easily recovered by means of a de-chopper circuit, essentially a de-multiplexer with the switch frequency at the chopping rate.

Applications of DSB signals to overcome direct-conversion deficiencies are described in commonly assigned, co-pending U.S. patent application Ser. No. 10/081,668 entitled "DOUBLE SIDEBAND INTERMEDIATE FREQUENCY RADIO RECEIVER ARCHITECTURE," filed Feb. 20, 2002, and commonly assigned, co-pending U.S. patent Ser. No. 10/068,293 entitled "DOWN/UP-CONVERSION MIXER FOR DIRECT CONVERSION RADIOS," filed Feb. 6, 2002, the content of which is hereby incorporated by reference. However, both approaches described in those applications require two mixing steps: an up-conversion after a down-conversion.

Figure 2:
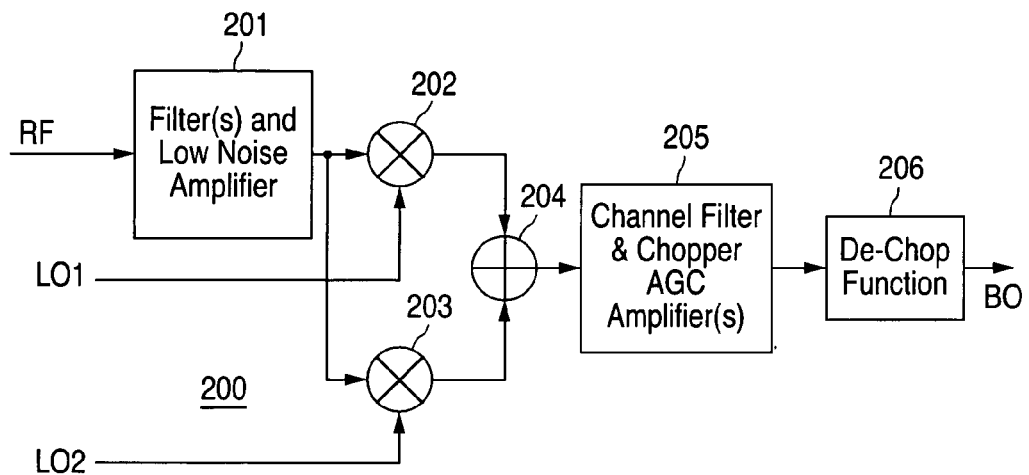
FIG. 2 depicts a block diagram of a chopper-direct-conversion radio receiver utilizing dual mixers according to one embodiment of the present invention.

FIG. 2 depicts a block diagram of a chopper-direct-conversion radio receiver utilizing dual mixers according to one embodiment of the present invention. The chopper-direct-conversion (CDC) receiver 200 is preferably implemented in a single integrated circuit and receives an antenna signal RF, which is passed through filter(s) and low noise amplifier 201. The output of filter(s) and low noise amplifier 201 is passed to two mixers 202 and 203, each of which mix the signal with one of two local oscillator signals LO1 and LO2.

CDC receiver 200 utilizes a dual-mixer to convert the antenna signal RF to a DSB signal in one mixing step with no intermediate frequency. Although there are two mixers 202 and 203, only one mixing step is employed because the mixers are not cascaded, but instead operate in parallel, each responsible for handling one of the two sidebands. The simplification to one mixing step results in no spurious frequencies being generated, and additionally eliminates the need for anti-alias filters required in a two step mixing approach (cascaded mixers).

After summing the two sideband signals produced by mixers 202 and 203, the composite DSB signal produced by adder 204 feeds the channel filter and chopper automatic gain circuit (AGC) amplifier(s) 205. The subsequent de-chop function 206 exhibits a multiplying function, but is not counted as an additional mixing step.

The two mixers 202 and 203 and the adder 204 form a phase-alternating mixer (PAM), outputting a DSB signal in a single mixing step by reversing the signal polarity of the output at a rate higher than the baseband frequencies. The signal format is similar to that of conventional chopper amplifiers, which is perhaps the most appropriate format to combat DC offset and low frequency noise impairments. In addition, the frequency of the PAM local oscillator(s) is far away from the receiving signal frequency, avoiding all direct-conversion problems associated with local oscillator leakages.

Figure 3A:
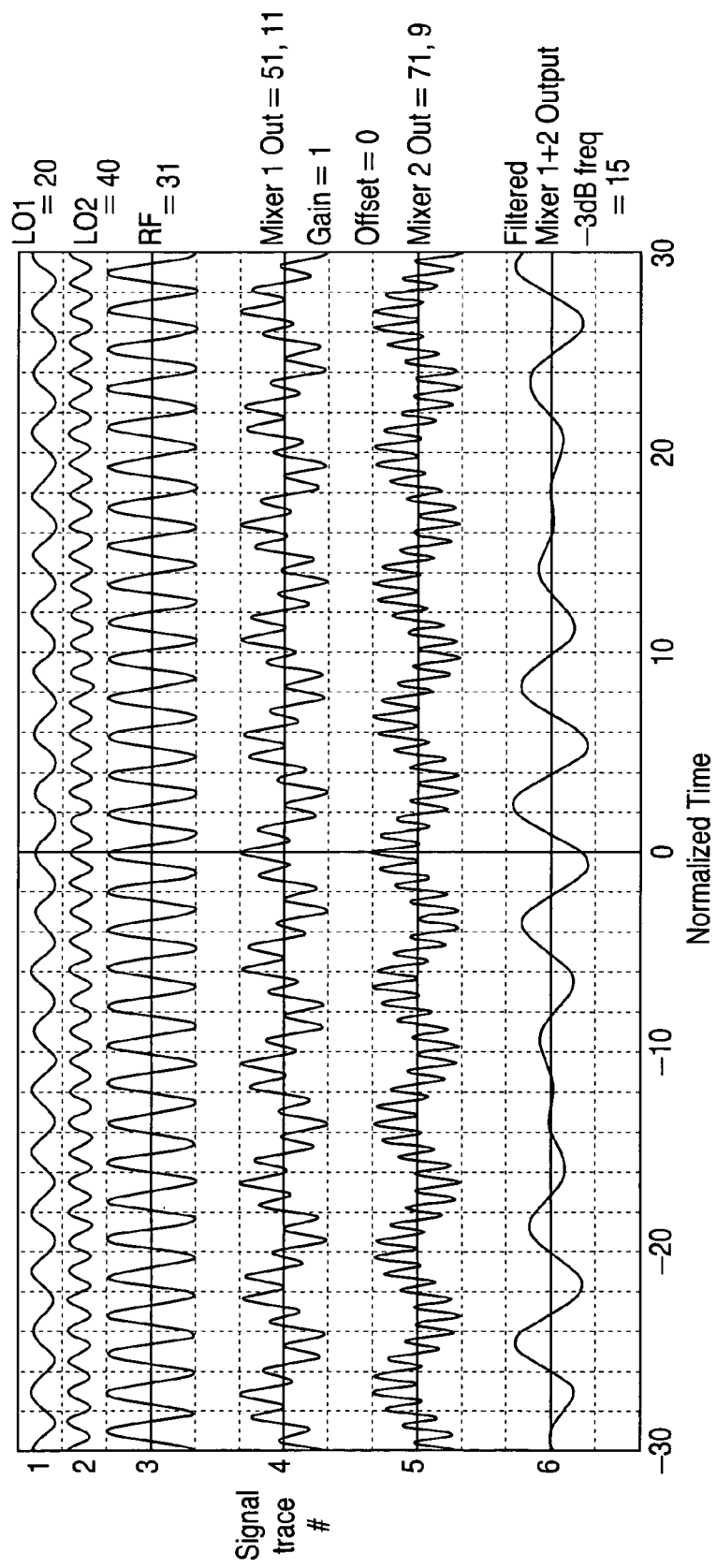
FIGS. 3A and 3B are timing diagrams showing waveforms for operation of a chopper-direct-conversion radio receiver utilizing dual mixers according to one embodiment of the present invention.
Figure 3B:
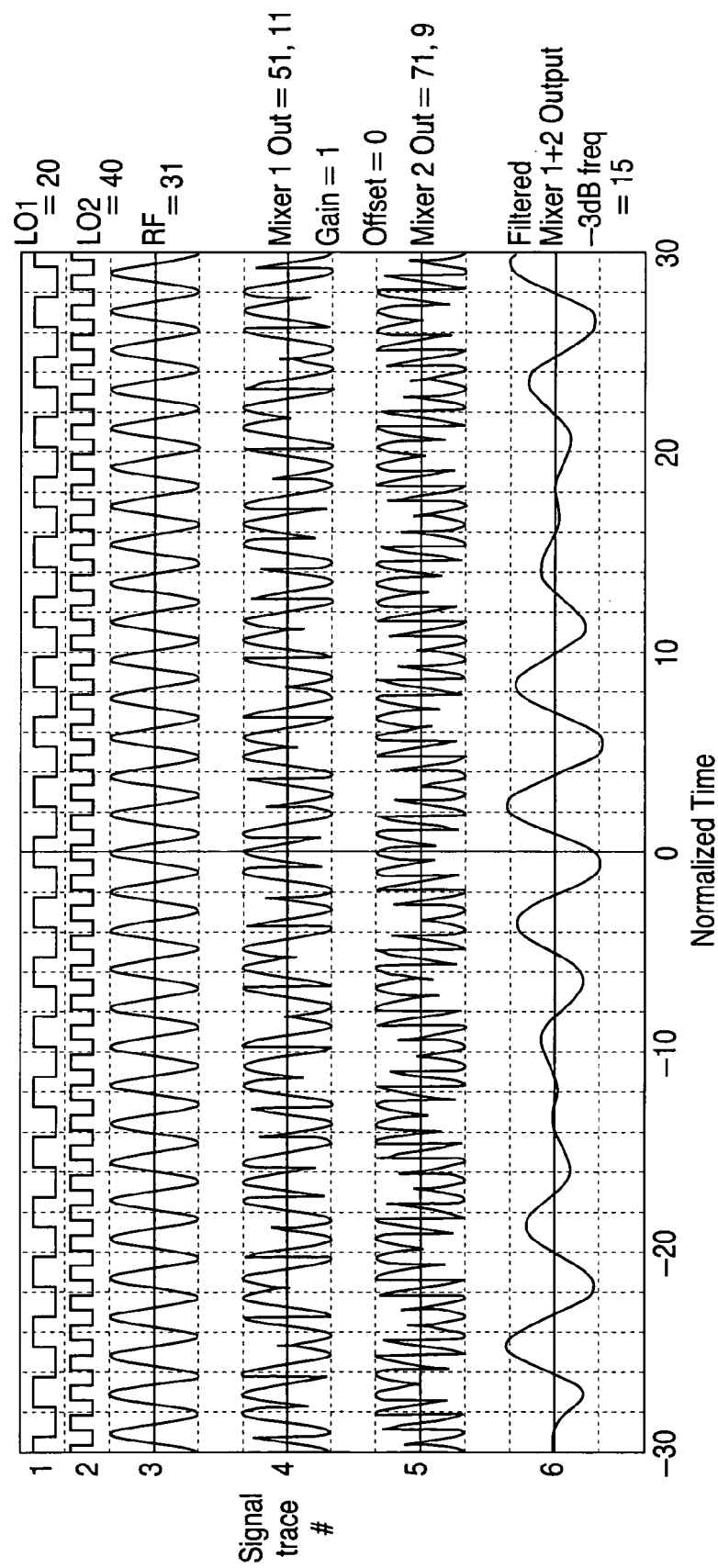

FIGS. 3A and 3B are timing diagrams showing waveforms for operation of a chopper-direct-conversion radio receiver utilizing dual mixers according to one embodiment of the present invention. The waveforms shown relate to operation of the CDC receiver depicted in FIG. 2. The down-conversion and phase-alternation (the chopping function) are all completed within the PAM. The frequencies of LO1 and LO2 are 20 and 40 cycles/unit time, respectively, while the antenna signal RF is 31 cycles/unit time. (When the antenna signal RF is 30, zero beat occurs; the setting of antenna signal RF to 31 cycles/unit time is for illustration purposes, allowing a beat frequency of 1 cycle/unit time to show at the de-chop output).

FIG. 3A depicts the waveforms for sinusoidal local oscillator signals LO1 and LO2 (traces 1 and 2, respectively), and illustrates the output of mixers 202 and 203 (traces 4 and 5, respectively) and the filtered output (trace 6). FIG. 3B depicts the same waveforms for square wave local oscillator signals. The DSB outputs (traces 6) in both FIGS. 3A and 3B have similar shapes.

Figure 4:
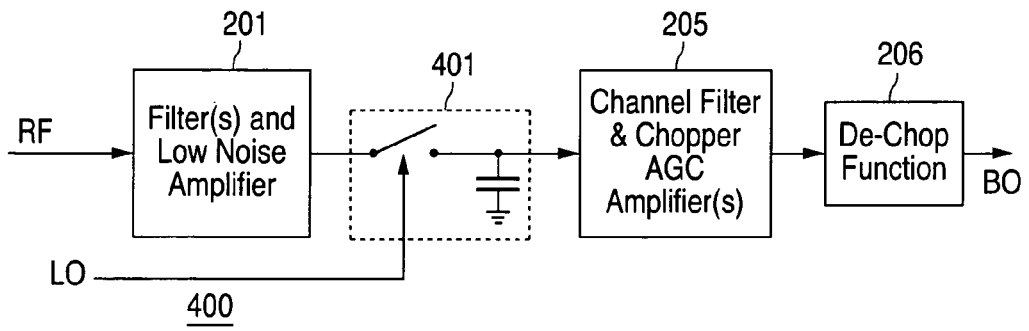
FIG. 4 depicts a block diagram of a chopper-direct-conversion radio receiver utilizing a single impulse-sampler mixer according to one embodiment of the present invention.

FIG. 4 depicts a block diagram of a chopper-direct-conversion radio receiver utilizing a single impulse-sampler mixer according to one embodiment of the present invention. The dual mixer approach of FIG. 2 represents one of two classes of CDC radios; CDC radios may also be implemented with a single mixer. CDC radio receiver 400 is preferably implemented in a single integrated circuit and utilizes a single mixer to obtain the DSB signal from an antenna signal RF in one mixing step by employing an impulse sampler 401 as the PAM. Impulse sampler 401 samples and holds the value of the input signal (the output of filter(s) and low noise amplifier 201) at the sampling instant, then afterwards outputs that value to the subsequent channel filter and chopper AGC amplifier(s) 205.

Figure 5:
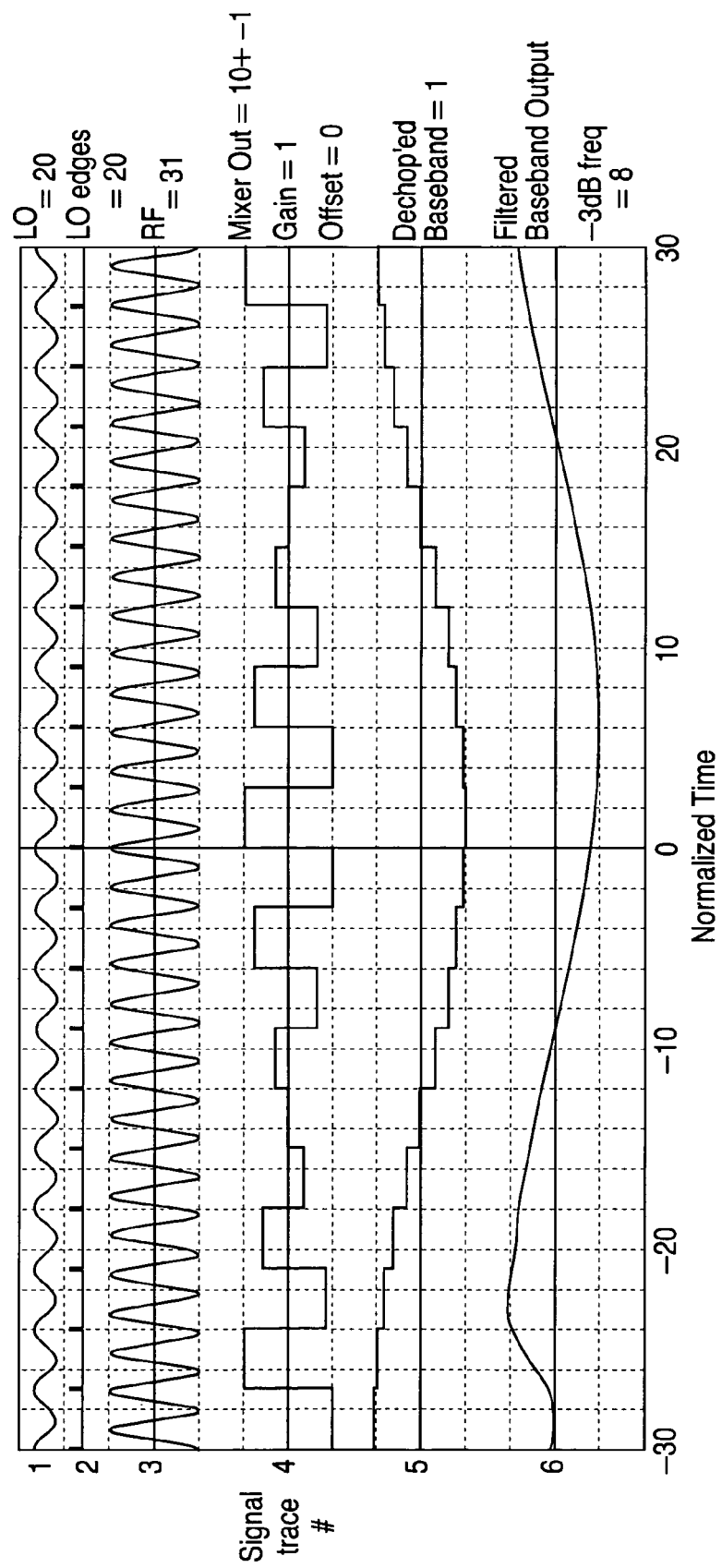
FIG. 5 is a timing diagram showing waveforms for operation of a block diagram of a chopper-direct-conversion radio receiver utilizing a single impulse-sampler mixer according to one embodiment of the present invention.

FIG. 5 is a timing diagram showing waveforms for operation of a block diagram of a chopper-direct-conversion radio receiver utilizing a single impulse-sampler mixer according to one embodiment of the present invention. The sinusoidal local oscillator signal LO (trace 1) having a frequency of 20 cycles/unit time is employed to derive the sampling timing (trace 2) for for the sampling instants at which the input antenna signal RF (trace 3) is sampled and held, then output (trace 4).

In CDC receiver 400, the phase-alternating function is accomplished by selecting the appropriate frequency for the local oscillator, which is two-thirds of the frequency of the antenna signal RF, as described in further detail below. (Note that the zero beat frequency for the antenna signal is at 30 cycles/unit time; an RF frequency of 31 cycles/unit time generates a beat frequency of 1 cycle/unit time at the baseband output). The de-chopped output (trace 5), from the recovered transmit signal or filtered baseband output (trace 6) is derived), is synchronous to the local oscillator.

Impulse samplers are theoretical devices requiring a zero-width sampling aperture. In actual practice, the impulse sampler may be replaced with a track-and-hold circuit, an approach exhibiting almost identical results as the impulse sampler but physically realizable. Other alternatives such as widening or shaping the sampling aperture are also feasible if some signal filtering is desired.

Figure 6:
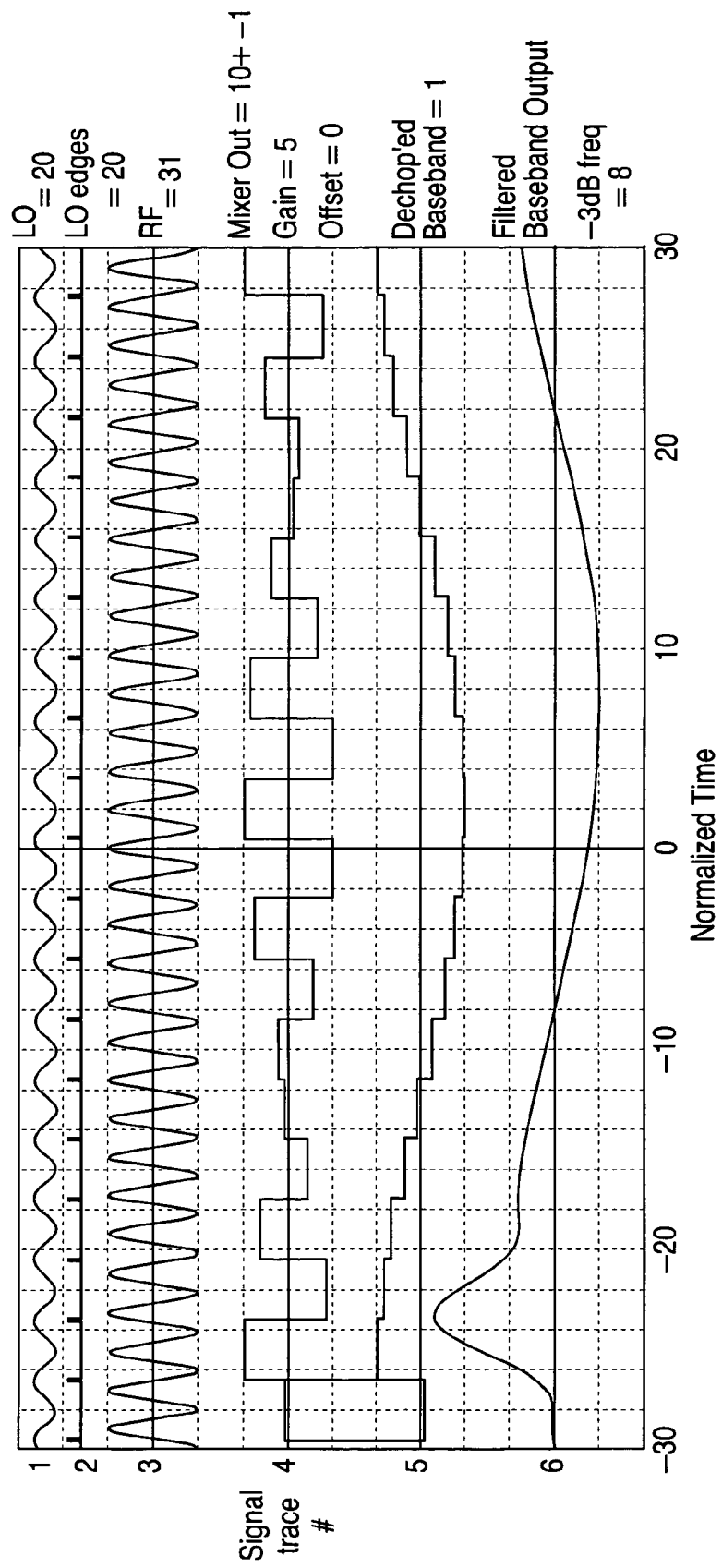
FIG. 6 is a timing diagram showing waveforms for operation of a block diagram of a chopper-direct-conversion radio receiver utilizing a rectangular window averaging circuit in lieu of a single impulse-sampler mixer according to one embodiment of the present invention.

FIG. 6 is a timing diagram showing waveforms for operation of a block diagram of a chopper-direct-conversion radio receiver utilizing a rectangular window averaging circuit in lieu of a single impulse-sampler mixer 401 according to one embodiment of the present invention. The circuit averages the RF input (trace 3) during the period between two consecutive timing pulses (trace 2) based on the local oscillator (trace 1), and outputs the averaged value after that period (trace 4). The de-chopped version (trace 5) is then filtered (trace 6) to obtain the recovered transmit baseband.

Unlike the impulse sampler, the rectangular window averaging circuit exhibits residual values (traces 4–6) after start-up during the normalized time period from −30 to −20, an erratic behavior due to the residual history of the averaging function, whereas impulse samplers require no history function. The residue diminishes after time −20 and does not affect the normal receiving function. (Note that after time −20, trace 6 in FIG. 6 is almost identical to trace 6 in FIG. 5, except for lagging because of the intrinsic delay—i.e., the history generation—of the averaging function).

The PAM may be modeled by the following equation:

$$\cos(RF)(\cos(LO1)+\cos(LO2)) = 0.5[\cos(RF-LO1)+\cos(RF-LO2)] + 0.5[\cos(RF+LO1)+\cos(RF+LO2)]$$

where cos(RF) is the received signal from the antenna, cos(LO1) is the first local oscillator, cos(LO2) is the second local oscillator, $0.5[\cos(RF-LO1)+\cos(RF-LO2)]$ is the DSB output with both the upper and lower sidebands, and $0.5[\cos(RF+LO1)+\cos(RF+LO2)]$ is an unused high frequency residue that may be removed by a low pass filter. By deleting the unused term and scaling the constant, equation (2) becomes:

$$\cos(RF)(\cos(LO1)+\cos(LO2)) \Rightarrow \cos(RF-LO1)+\cos(RF-LO2) \quad (3)$$

where cos(RF−LO1) is the lower sideband and cos(RF−LO2) is the upper sideband.

These two sideband signals, although illustrated as two frequencies, can take the form of two frequency bands when the original modulating baseband signal contains complex signals rather than a single tone. The two bands of frequencies are mirror images of each other, with the midpoint between the two bands defining the zero beat or the carrier frequency ($f_{carrier}$) of the DSB signal (note that the carrier frequency component is suppressed in an ideal DSB signal). The frequency relationship is:

$$f_{carrier} = \frac{abs(LO1-LO2)}{2}, \quad (4)$$

$$f_{carrier} = abs(RF-LO1), \quad (5)$$

$$f_{carrier} = abs(RF-LO2), \quad (6)$$

or $$RF = \frac{(LO1+LO2)}{1}. \quad (7)$$

In the dual mixer case, these two local oscillator inputs LO1 and LO2 can be taken from two separate local oscillator sources that are either synchronous or asynchronous.

In the single mixer case, these two local oscillator inputs are extracted from the harmonic frequencies of the common local oscillator input. Since the harmonic content of an impulse consists of a series of frequencies that are integer multiples of the fundamental sampling frequency, these harmonics can be utilized as the LO1 and LO2 inputs.

For example, the local oscillator fundamental frequency in FIG. 5 is 20 cycles/unit time, so the harmonic frequencies are located at 40 cycles/unit time, 60 cycles/unit time, 80 cycles/unit time, etc. Applying the Fourier transform theory, these harmonics would exhibit equal magnitude as the fundamental component. In addition, a component also exists at 0 cycles/unit time. Based on these properties, the sampler can be modeled as a multi-mixer array followed by an output adder. Each individual mixer has a local oscillator input driven by one of the harmonic components. The configuration thus apparently has much similarity to the dual mixer CDC receiver depicted in FIG. 2, and thus can operate as a PAM with only one mixer and a single local oscillator output.

Note that any mixer driven with a non-sinusoidal local oscillator input can operate as a PAM. One example is the conventional switching mixer driven with a square wave local oscillator input. Due to the substantial amount of odd harmonics in the local oscillator input, the mixer always outputs some DSB components at certain corresponding RF frequencies in equation (7). An appropriate filter/amplifier/de-chopper combination placed after the mixer can recover these DSB signals.

In spite of the long series of harmonics, these single mixer configurations create alias receive responses. As reflected by equation (7), the RF receiving frequency is always at the midpoint of the two local oscillator frequencies. Since there are many local oscillator frequencies, the receiver exhibits multiple responses—i.e., at frequencies of 10 cycles/unit time, 30 cycles/unit time, 50 cycles/unit time, 70 cycles/unit time, etc. These responses are undesirable and must be attenuated. Some common solutions such as placing a SAW band select filter before the PAM may be applied, where the front-end filter allows only one of the aliases, also designated as the receiving frequency, to pass onto the PAM.

The window averaging CDC receiver illustrated by FIG. 6 incorporates a smoothing function during input sampling, and thus provides some high frequency filtering to the received signal. Other advanced windowing functions, as well as on-chip notch filters, may also be utilized to further suppress the alias responses.

The CDC architecture of the present invention is designed to replace conventional direct-conversion architectures, and retains direct-conversion advantages including: a single mixing step from input signal RF to output signal DSB, thus eliminating unwanted spurious responses; low operating frequencies for the channel filter and amplifier circuitries, resulting in high integration and low power operation; and no imaging response, requiring no image rejection mixers.

In addition, the CDC architecture of the present invention offers advantages not available from any direct-conversion approaches. The CDC receiver exhibits a large frequency difference between the input signal RF and the local oscillator inputs LO1 and LO2. The two local oscillator frequencies are far away from the frequency of the received signal RF, so that all direct-conversion problems associated with local oscillator leakages do not exist. Note that local oscillator leakages cause many harmful problems when the local oscillator frequency is at or near the receiving frequency. However, if the difference between the input signal RF and the local oscillator frequencies is large, the beat frequency would fall outside the passband of the receive channel filter. Hence, the channel filter heavily attenuates the interfering component, resulting in virtually no interferences to the receiver.

The CDC receiver is immune to low frequency noise and DC offset. The DSB signal allows a high operating frequency for the channel filter and amplifier blocks. Therefore, the intrinsic low frequency noise and DC offset generated within the mixer/filter/amplifier blocks do not interfere with the wanted received signal.

The CDC receiver employs discrete sampled data processing. The DSB signal can operate in a discrete sampled data format. One typical example is the discrete output sequence from the impulse sampler, which is a direct result of the sample-and-hold process. The format is highly desirable in interfacing to switched-capacitor filters and discrete signal processing circuits. In addition, time delay and many other signal processing functions are extremely easy to implement in the sampled data domain, while being nearly impossible to achieve in the continuous time domain.

The CDC receiver may employ precision-switched capacitor filtering. The discrete sampled data format may be utilized throughout the whole receiver circuit. Since all circuits are clocked and synchronous to the local oscillator frequency, many noise issues due to aliases among various system frequencies can be eliminated. Consequently, switched capacitor filters or any other clocked circuits may be employed, unlike conventional radio designs in which clocked filters are usually prohibited because of unsolvable alias issues.

The CDC may utilize a single clock and complete alternating current (AC) coupled signal processing. The DSB data format can be utilized beyond the analog-to-digital converter (ADC) boundary, allowing no baseband signals in any of the analog blocks. The de-chop function which converts the DSB signal to baseband is simply a matter of sign changing in the digital signal processing (DSP) section.

The CDC receiver employs fast peak-to-peak amplitude estimation. Estimating peak-to-peak amplitude of a DSB signal is much quicker than estimating any other types of signals due to the switching nature of the signal where the opposite polarity of the signal excursion is consecutively output to the estimating circuit. This signal property allows fast DC offset cancellation and fast AGC amplifiers to be implemented. In addition, sizes of on-chip loop filter capacitors may be decreased due to a faster loop constant, correspondingly reducing integration cost.

It should be noted that nearly all the advantages and solutions described above rely on intrinsic circuit properties rather than external techniques such as local oscillator shielding and DC offset cancellation loops utilized in conventional direct-conversion radios.

The CDC radio architecture of the present invention offers solutions to virtually all problems found in conventional direct-conversion radios. The signal paths carry no baseband signals and thus are suitable for large-scale circuit integration, and the sample data signal format allows precision switched capacitor filters to be incorporated, resulting in superb circuit performance and stability. The CDC radio outperforms many existing radios, including well-performed SAW-based super-heterodyne radios.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A receiver circuit comprising:
    an input signal having an input signal frequency and at least one local oscillator signal having at least one frequency selected from
        a first local oscillator frequency, and
        second and third local oscillator frequencies,
    wherein the second and third local oscillator frequencies are equal to the input signal frequency plus the first local oscillator frequency and to the input signal frequency minus the first local oscillator frequency, respectively; and
    a phase alternating mixer receiving the input signal and generating a double sideband signal in a single mixing step, wherein the double sideband signal is a function is a function of (a) the input signal frequency minus the second local oscillator frequency and (b) the input signal frequency minus the third local oscillator frequency.

2. The receiver circuit according to claim 1, wherein the phase-alternating mixer further comprises:
    two parallel mixers each mixing the input signal with one of two local oscillator signals; and
    an adder receiving and summing outputs from the two parallel mixers.

3. The receiver circuit according to claim 1, wherein the phase-alternating mixer further comprises:
    a track-and-hold circuit sampling the input signal based upon the at least one local oscillator signal.

4. The receiver circuit according to claim 1, wherein the phase-alternating mixer further comprises:
    a window averaging circuit averaging the input signal across a period of the at least one local oscillator signal.

5. The receiver circuit according to claim 1, further comprising:
    a de-chopper coupled to an output of the phase-alternating mixer and demultiplexing the double sideband signal with a switch frequency equal to a frequency of the at least one local oscillator signal.

6. The receiver circuit according to claim 5, further comprising:
    a filter and low noise amplifier coupled between an antenna and the phase-alternating mixer; and
    a channel filter and amplifier coupled between the phase-alternating mixer and the de-chopper.

7. A single integrated circuit containing the receiver circuit according to claim 1.

8. A method of operating a receiver comprising:
receiving an input signal having an input signal frequency and at least one local oscillator signal having at least one frequency selected from
a first local oscillator frequency, and
second and third local oscillator frequencies,
wherein the second and third local oscillator frequencies are equal to the input signal frequency plus the first local oscillator frequency and to the input signal frequency minus the first local oscillator, respectively; and
generating a double sideband signal in a single mixing step, wherein the double sideband signal is a function of (a) the input signal frequency minus the second local oscillator frequency and (b) the input signal frequency minus the third local oscillator frequency.

9. The method according to claim 8, wherein the step of generating a double sideband signal in a single mixing step further comprises:
employing two parallel mixers each mixing the input signal with one of two local oscillator signals; and
employing an adder receiving and summing outputs from the two parallel mixers.

10. The method according to claim 8, wherein the step of generating a double sideband signal in a single mixing step further comprises:
employing a track-and-hold circuit sampling the input signal based upon the at least one local oscillator signal.

11. The method according to claim 8, wherein the step of generating a double sideband signal in a single mixing step further comprises:
employing a window averaging circuit averaging the input signal across a period of the at least one local oscillator signal.

12. The method according to claim 8, further comprising:
demultiplexing the double sideband signal with a switch frequency equal to a frequency of the at least one local oscillator signal.

13. The method according to claim 12, further comprising:
filtering and low noise amplifying the input signal; and
channel filtering and amplifying the double sideband signal prior to demultiplexing the double sideband signal.

14. The method according to claim 8, further comprising:
operating a single integrated circuit containing an integrated receiver circuit.

15. A Phase alternating mixer comprising:
an antenna input receiving a radio frequency signal; and
one or more local oscillator inputs receiving at least one local oscillator signal having at least one frequency selected from
a first local oscillator frequency, and
second and third local oscillator frequencies,
wherein the second and third local oscillator frequencies are equal to the input signal frequency plus the first local oscillator frequency and to the input signal frequency minus the first local oscillator frequency, respectively; and
an output on which the phase alternating mixer produces a double sideband signal from the radio frequency signal and the at least one local oscillator signal without cascaded mixing, wherein the double sideband signal is a function of (a) the input signal frequency minus the second local oscillator frequency and (b) the input signal frequency minus the third local oscillator frequency.

16. The phase-alternating mixer according to claim 15, further comprising:
two parallel mixers each mixing the radio frequency signal with one of two local oscillator signals; and
an adder receiving and summing outputs from the two parallel mixers.

17. The phase-alternating mixer according to claim 15, further comprising:
a track-and-hold circuit sampling the radio frequency signal based upon the at least one local oscillator signal.

18. The phase-alternating mixer according to claim 15, further comprising:
a window averaging circuit averaging the radio frequency signal across a period of the at least one local oscillator signal.

19. A receiver circuit comprising a phase-alternating mixer according to claim 15, further comprising:
a de-chopper coupled to an output of the phase-alternating mixer and demultiplexing the double sideband signal with a switch frequency equal to a frequency of the at least one local oscillator signal.

20. The receiver circuit according to claim 19, further comprising:
a filter and low noise amplifier coupled between the antenna input and the phase-alternating mixer; and
a channel filter and automatic gain circuit amplifier coupled between the phase-alternating mixer and the de-chopper.

* * * * *